Figure 1:
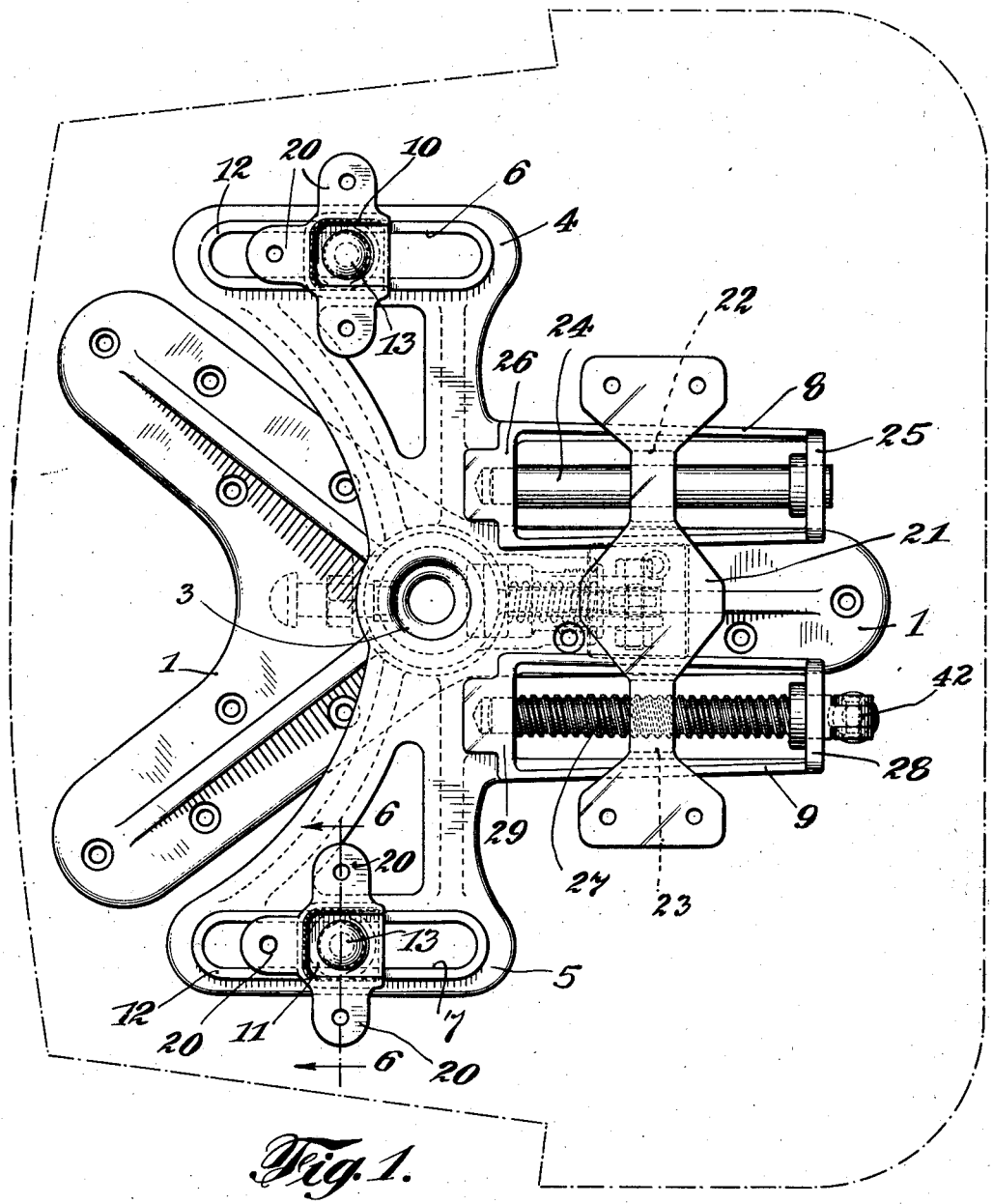

Oct. 15, 1929.   C. T. HANSEN   1,731,461
ADJUSTABLE SEAT
Filed June 11, 1927   5 Sheets-Sheet 1

INVENTOR
Conrad T. Hansen
BY
Henry Van Arsdale
his ATTORNEY

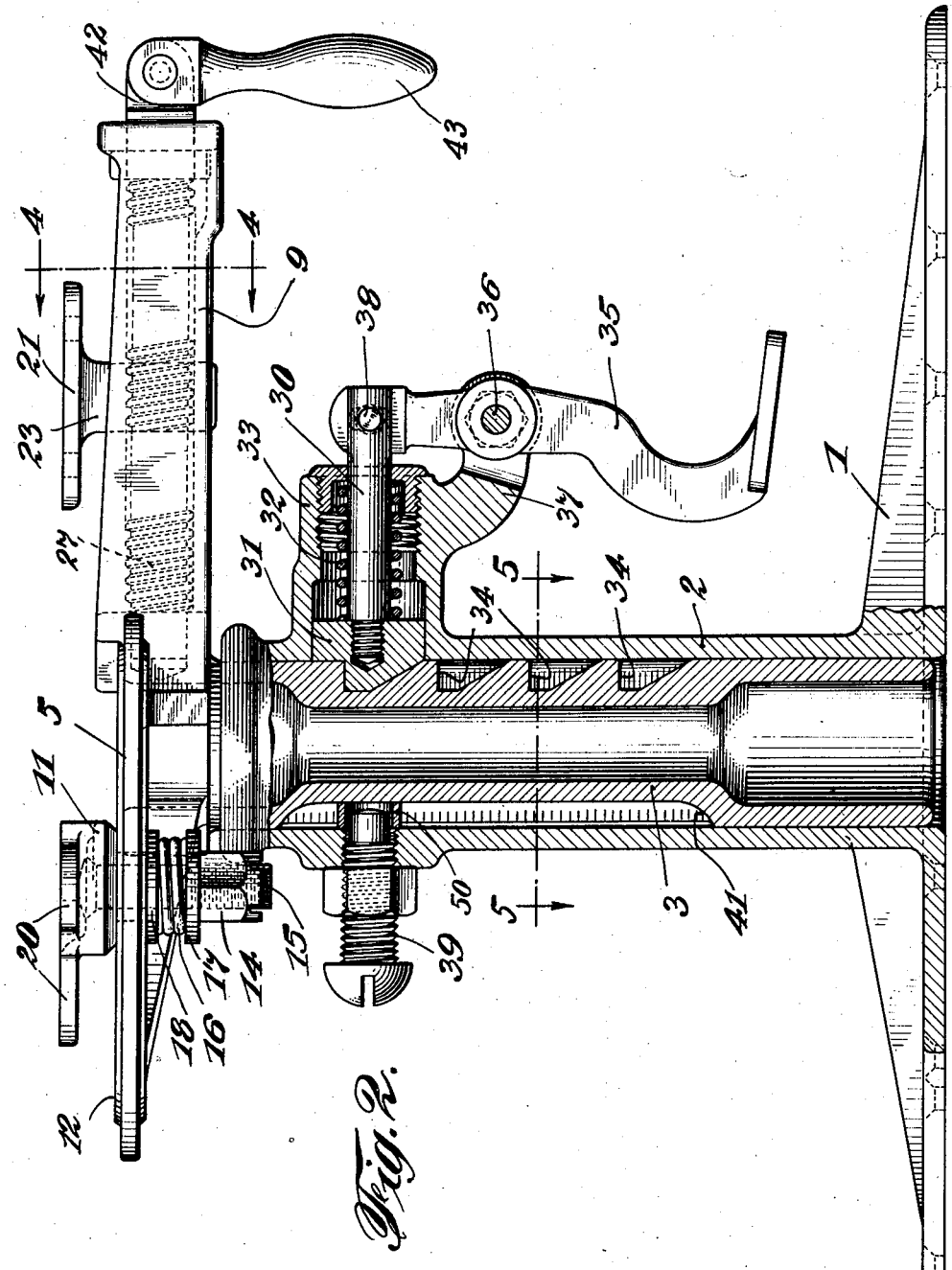

Oct. 15, 1929.  C. T. HANSEN  1,731,461
ADJUSTABLE SEAT
Filed June 11, 1927  5 Sheets-Sheet 3
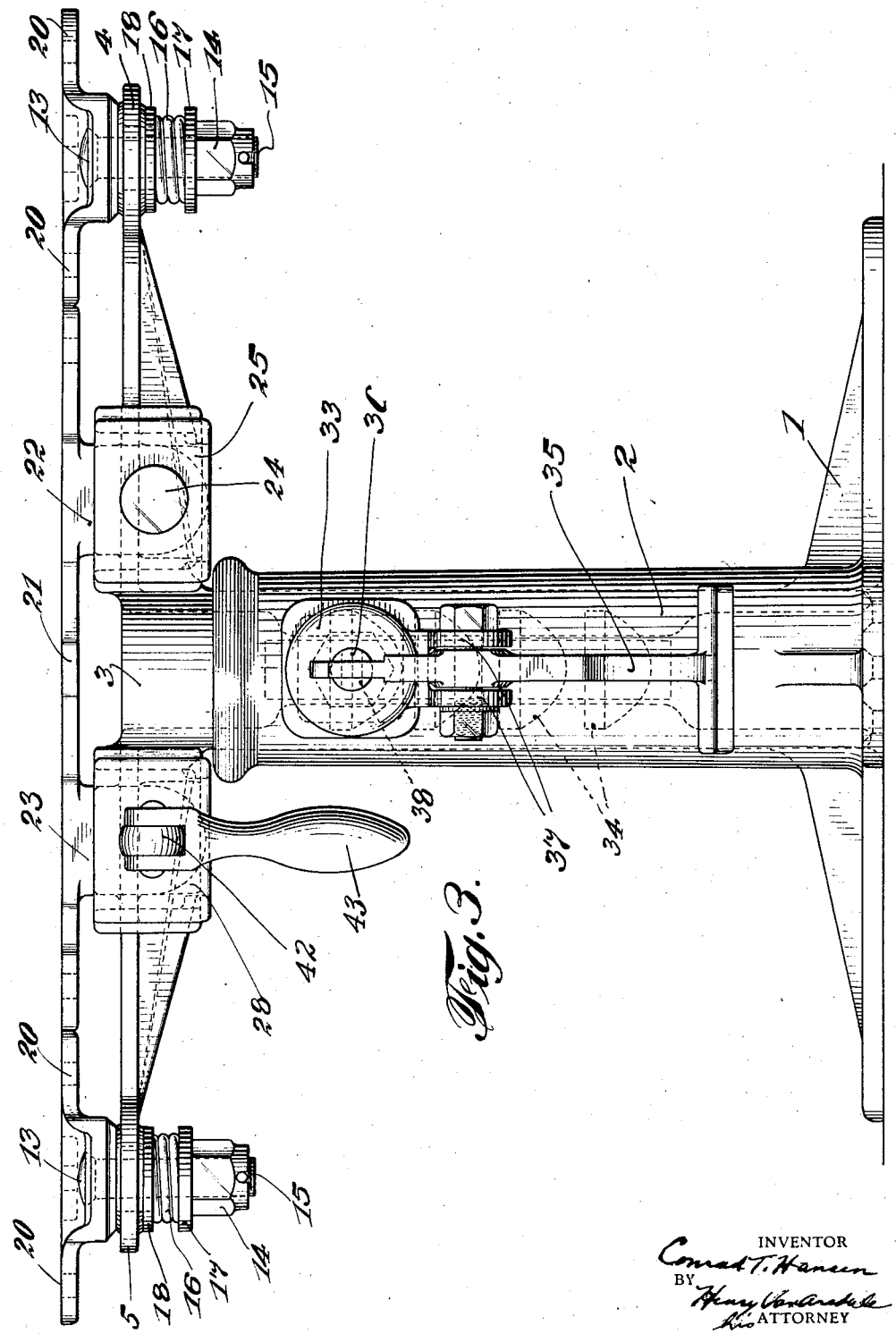
INVENTOR
Conrad T. Hansen
BY
ATTORNEY

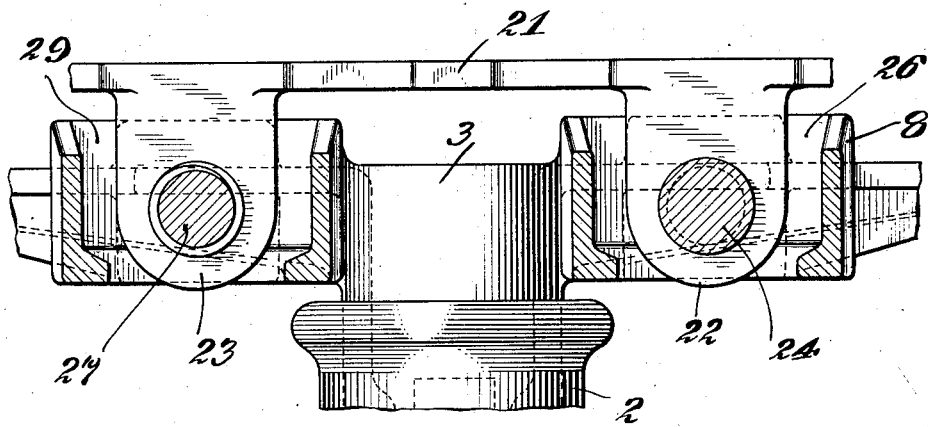
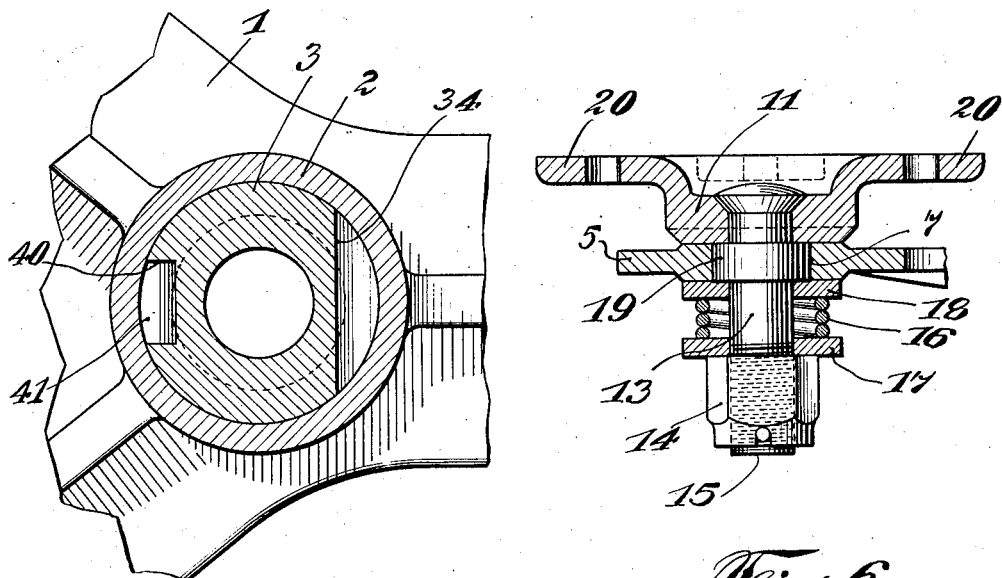

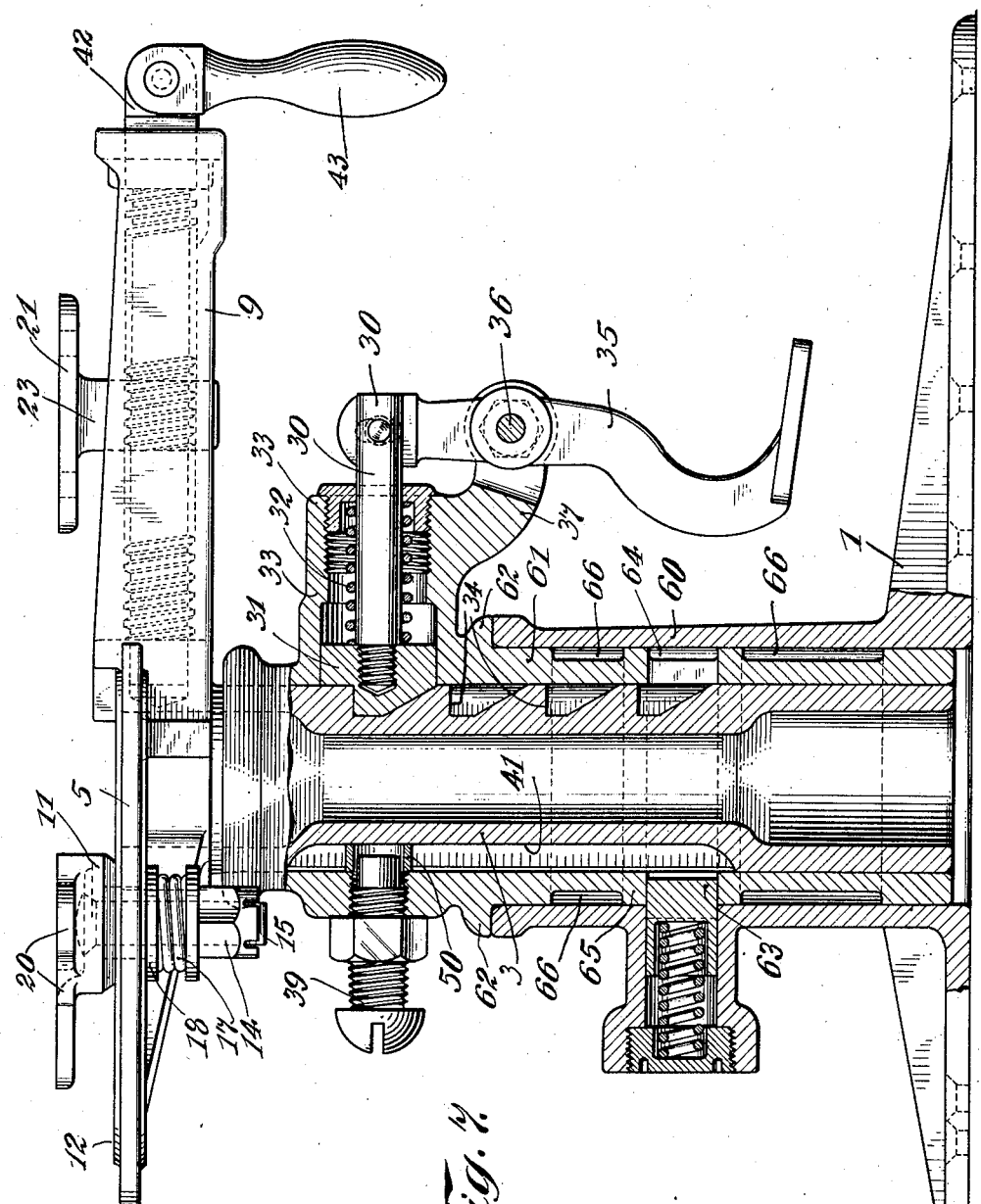

Patented Oct. 15, 1929

1,731,461

UNITED STATES PATENT OFFICE

CONRAD T. HANSEN, OF PHILADELPHIA, PENNSYLVANIA, ASSIGNOR TO HALE & KILBURN CO., OF PHILADELPHIA, PENNSYLVANIA, A CORPORATION OF DELAWARE

ADJUSTABLE SEAT

Application filed June 11, 1927. Serial No. 198,106.

This invention relates to seats, and more particularly relates to seats which are adjustable as to height and as to the position of the seat back and seat cushion.

One of the principal aims of this invention is to provide a seat which is especially well suited for use as a driver's seat in auto busses, electric railway cars, or other vehicles, where the safety factor is dependent in a considerable degree on the driver being seated comfortably within convenient and easy reach of the controls of the vehicle. In providing the seating accommodation for the driver of the vehicle it must be recognized that drivers differ from each other in size and build, and that, therefore, although a seat having a certain adjustment may suit drivers of a particular size and build, the seat is pretty sure to be uncomfortable and unsuited to drivers having a different size or build. Accordingly, one object of my invention is to provide a seat which may be adjusted readily and easily to be comfortable and well suited to drivers of different physical proportions and build, and thereby to enhance the safety factor attending the operation of the vehicle.

A further object of this invention is to provide a seat of the character referred to which can be revolved so that when used in an electric railway car, for instance, it is available for use by the driver when the car is traveling in one direction, and may be revolved to accommodate a passenger when the car is traveling in the opposite direction, permitting the passenger to face in the direction of travel.

Another object of this invention is to provide a seat of the character described which is sturdy and durable and permits comfortable and roomy upholstering of seat cushion and seat back.

Other objects of this invention will be in part obvious and in part pointed out hereinafter.

In accordance with my invention, the seat cushion, or preferably a unit comprising a seat cushion and seat back, with or without appropriate arms, as desired, hereinafter called a seating unit, is supported on a spider or brackets which are adjustable forwardly and rearwardly on a frame which, in turn, is adjustable vertically on a pedestal rigidly secured to the floor of the vehicle in which the seat is placed. Means are provided for latching the frame in any one of the different elevations to which the frame may be adjusted, and means are provided whereby the spider or brackets may be conveniently adjusted on the frame. Thus the seat may be adjusted to accommodate drivers of different physical proportions and in accordance with the height and forward adjustment most satisfactory and comfortable for the particular driver who is to occupy the seat. In a modified form, the seat is also rotatable.

In order that a clearer understanding of this invention may be had, attention is hereby directed to the accompanying drawings forming a part of this application and illustrating certain possible embodiments of this invention. Referring to the drawings, Fig. 1 is a top view of a seat embodying my invention, the seating unit being merely indicated by dot and dash lines; Fig. 2 is a side view of the same, partly in elevation and partly in section; Fig. 3 is a front view of the same; Fig. 4 is a sectional view of a detail thereof and is taken on the line 4—4 of Fig. 2; Fig. 5 is a sectional view through the pedestal sleeve and is taken on the line 5—5 of Fig. 2; Fig. 6 is a sectional view of another detail of the seat and is taken on the line 6—6 of Fig. 1; and Fig. 7 is a sectional view of a modified construction, permitting rotation of the seat. Similar reference characters refer to similar parts throughout the several views of the drawings.

Referring to the drawings, there is a pedestal including a suitable base 1 and a vertical central sleeve 2. The base 1 is adapted to be secured rigidly and firmly to the floor of an auto bus, electric railway car, or other vehicle. Within sleeve 2 is enclosed a shaft 3 to the top of which is rigidly secured a frame or table having opposite side extensions 4 and 5 provided with elongated slots 6 and 7. The frame has two open rectangular extensions 8 and 9. Each side extension 4 and 5 supports a bracket 10 and 11, each bracket (see Fig. 6) having a flat bottom surface bridging the slot of the extension and having a flat bottom surface slidably resting on flat surfaces, such as 12, surrounding the slots. A rivet or bolt 13 penetrates each bracket 10 and 11. A nut 14 engaged on the threaded end 15 of each bolt serves to compress a spring 16 coiled between two washers, one of which, 17, is intermediate the nut and the spring and the other of which, 18, is intermediate the spring and the frame. Preferably, each bolt 13 is formed with an integral collar 19 which seats in the slot of the frame and prevents sidewise movement of the bracket on the frame. Each bracket is provided with suitable ears or projections 20 upon which the seating unit may be placed and secured.

The seating unit assembly is adapted to rest on and be secured, preferably toward its front, on a flat elongated bracket 21 which has two depending lugs 22 and 23, lug 22 being disposed in the rectangular projection 8 of the frame and lug 23 being disposed in the rectangular projection 9 of the frame. Lug 22 has a smooth perforation penetrated by a shaft 24 which extends between and is fixed to the front wall 25 and the rear wall 26 of rectangular extension 8. Lug 23 has a threaded perforation in which is engaged a threaded shaft 27 which extends between and is rotatively journaled in the front wall 28 and rear wall 29 of the rectangular extension 9. Threaded shaft 27 is confined against axial movement in extension 9 and has an end 42 projecting outside of wall 28. A handle 43 is pivotally secured to the projecting end of screw 27, so that this screw can be turned conveniently to move the bracket 21 on the frame toward and from the pedestal. In view of the fact that the seating unit is rigid and is also secured to side brackets 10 and 11, these brackets will move in unison with bracket 21. In view of the manner in which the side brackets are mounted on the frame, these brackets are readily movable with respect to the frame, and at the same time are held against vibration with respect thereto, both after or during adjustment of the seating unit on the frame. Brackets 10, 11 and 21 may be parts of a rigid spider.

A latch device, including stem 30, head 31, and spring 32, is housed in a suitable boss 33 formed on the sleeve 2 of the pedestal, and the stem 3 which supports the frame and spider is provided with a series of notches 34 which may be engaged selectively with the latch head 31 to hold the spider and the seating unit in various elevations with respect to the pedestal. Preferably a foot lever 35 is pivoted, as at 36, on an extension 37 of boss 33 and is engaged, as at 38, with a projecting end of latch stem 30, so that the operator may readily and easily withdraw the latch from engagement with the stem 3 and effect lowering of the seat.

In order to prevent rotation of the stem 3 within sleeve 2, which might dislocate the coaction between the latch head 31 and the notches 34, a screw 39 may be provided which penetrates the sleeve 2 and has an end disposed in a groove 40 formed in the stem 3. This screw not only prevents rotation of the stem 3 in the sleeve 2 but also, by engaging the closed lower end 41 of the groove, prevents the stem 3 from being completely removed from the sleeve until the end of screw 39 has been removed from the groove. Preferably a square block or shoe 50, made with hardened surfaces, is carried on the end of screw 39. This block functions to prevent the end of screw 39 burrowing into the side walls of groove 40 and provides a wider bearing against the walls of the groove, thus preventing the development of play and looseness and increasing the life of the seat.

The manner of adjusting a seat of the character described may be accomplished readily and easily. If the driver desires the cushion to be higher, he merely grasps the seating unit and pulls it upward until the desired height is reached. The latch head 31 will automatically enter the appropriate notch in the shaft 30 and hold the seat adjusted to this height. If the driver desires the seat cushion to be adjusted forwardly or rearwardly on the pedestal, he merely grasps the handle 43 and rotates the screw 27 in the appropriate direction until the seat cushion is in the desired location. To lower the seat, the operator need only engage the foot lever 35 with his foot to disengage the latch head 31 from the shaft 30, whereupon the seat will fall by gravity into a lower position.

The manner of supporting the seating unit at the locations 4, 5, 24 and 27 affords very firm bearings for the seating unit and eliminates torsional twist, thus increasing the strength and durability of the seat.

In case any rattle should develop between the side brackets and the frame, it is only necessary to take up a little on the nuts 14, thus increasing the tension of the springs 16.

In the modification shown in Fig. 7, illustrating a rotatable construction, the pedestal comprises a rigid sleeve 60 and a rotatable sleeve 61 within sleeve 60. The screw 39 and the latch device 30 are mounted on the sleeve 61. The spindle 3 is disposed within the pedestal sleeve 61, and the spindle 3 and sleeve 61 are together rotatable in the fixed pedestal sleeve 60. Preferably sleeve 61 has an annular shoulder 62 resting on the top edge of the stump pedestal sleeve 60. Sleeve 61 and spindle 3 are prevented from being lifted from the pedestal by means of a beveled plunger 63 which is carried on the pedestal and engages in a groove 64 formed on sleeve 61. One or more stops 65 may be positioned in this groove to limit the extent of rotation permitted. The groove 64 and the cut-out portions 66 lighten the construction and serve as oil pockets.

Seats of this type have a special advantage for use under certain conditions, for instance at the opposite ends of electric railway cars, permitting use alternately by the driver and by a passenger, thus increasing the passenger seating capacity of the vehicle.

From the above it will be readily apparent that not only is the seat adjustable to accommodate drivers of various builds and sizes comfortably and within the most convenient reach of the controls of the vehicle, but the seat is also very compact, occupying a very small amount of space considering that the seat is adjustable, and the seat is extremely rigid and durable and is not apt to break down. Accordingly, my invention increases the safety of operation of the vehicle in which the seat is mounted and at the same time conserves the space which is available for use by the passengers. The adjustments are also an advantage since they render the seat suitable for different types of busses, electric railway cars, and other vehicles, which vary in the amount of space available for the driver's seat and in the positions of the controls used in operating the vehicle. It will also be noted that due to the adjusting handle 43 hanging pendant, accidental rotation of the adjusting screw 27 is prevented after the seat has been adjusted.

As many changes could be made in the above construction and as many apparently widely different embodiments of this invention could be made without departing from the scope thereof, it is intended that all matter contained in the above description or shown in the accompanying drawings shall be interpreted as illustrative and not in a limiting sense.

What I claim is:

1. In a seat of the character described, in combination, a frame, brackets adjustable horizontally on the frame, a seating unit carried on said brackets, and means for adjusting the position of said brackets on the frame whereby the position of the seating unit may be varied with respect to the frame, said means including a screw journaled on the frame and having a threaded connection with one of said brackets, said last named bracket also having a lug and said frame having a guide rod parallel with said screw and penetrating said lug.

2. In a seat of the character described, the combination with a frame having an elongated slot, of a bracket resting on the frame and disposed over said slot, a stud member secured to said bracket and passing through said slot, said stud member having an enlarged portion in sliding engagement with the sides of said slot, a retaining element, and a resilient member adjustably secured to said stud member holding said retaining element disposed against the under side of said slot and said bracket slidably against the frame with resilient pressure.

3. In a seat of the character described, in combination, a spider frame, said spider frame comprising a pair of slotted side wing extensions and a pair of open forward rectangular extensions, a bracket adjustably secured to each of said side wing extensions and a bracket adjustably secured to said pair of forward rectangular extensions, and a seating unit carried on said brackets.

4. In a seat of the character described, in combination, a spider frame, said spider frame comprising a pair of side wing extensions and a pair of forward rectangular extensions, an elongated slot in each of said side wing extensions, a bracket disposed over each of said slots, a bracket disposed over said pair of forward rectangular extensions, said bracket last named having a threaded lug cooperating with a screw member journaled in one of said forward rectangular extensions, and an apertured lug cooperating with a guide rod fixed to the other of said forward rectangular extensions, and a seating unit carried on said brackets.

This specification signed this fourth day of June, 1927.

CONRAD T. HANSEN.